(12) United States Patent
Kil et al.

(10) Patent No.: US 8,179,493 B2
(45) Date of Patent: May 15, 2012

(54) LIQUID CRYSTAL DISPLAY DEVICE AND MANUFACTURING METHOD THEREOF

(75) Inventors: Wang Seob Kil, Daejeon (KR); Sang Nam Ku, Yeongyang-gun (KR)

(73) Assignee: LG Display Co., Ltd., Seoul (KR)

( * ) Notice: Subject to any disclaimer, the term of this patent is extended or adjusted under 35 U.S.C. 154(b) by 284 days.

(21) Appl. No.: 12/314,854

(22) Filed: Dec. 17, 2008

(65) Prior Publication Data

US 2009/0161056 A1    Jun. 25, 2009

(30) Foreign Application Priority Data

Dec. 21, 2007    (KR) .......................... 10-2007-0135090

(51) Int. Cl.
    *G02F 1/136*    (2006.01)
(52) U.S. Cl. .................. 349/52; 349/49; 349/50; 349/51
(58) Field of Classification Search ............... 349/49–52
    See application file for complete search history.

(56) References Cited

U.S. PATENT DOCUMENTS

| 5,311,342 A * | 5/1994 | Watanabe ................... 349/152 |
| 2003/0117536 A1* | 6/2003 | Jeon ............................ 349/40 |
| 2007/0279543 A1* | 12/2007 | Park et al. ................... 349/40 |

FOREIGN PATENT DOCUMENTS

| KR | 10-2005-0038968 A | 4/2005 |
| KR | 10-2007-0116510 A | 12/2007 |

* cited by examiner

*Primary Examiner* — Phu Vu

(74) *Attorney, Agent, or Firm* — McKenna Long & Aldridge LLP

(57) ABSTRACT

Disclosed is a LCD device having a structure capable of improving the quality of images is disclosed. The LCD device includes, an image display portion composed of pixels, the image display portion defined by the crossing of gate wires and data wires; a common wire located on the outside of the image display portion; a test wire located adjacent to a part of the common wire; and a wire connection electrode for connecting the common wire with the test wire.

7 Claims, 4 Drawing Sheets

LIQUID CRYSTAL DISPLAY DEVICE AND MANUFACTURING METHOD THEREOF

This application claims the benefit of Korean Patent Application No. 10-2007-0135090, filed on Dec. 21, 2007, which is hereby incorporated by reference for all purposes as if fully set forth herein.

BACKGROUND OF THE INVENTION

1. Field of the Invention

The present invention relates to a liquid crystal display device, and more particularly to a liquid crystal display device that is adapted for improving the quality of images (or pictures), and the manufacturing method thereof.

2. Discussion of the Related Art

Liquid crystal display (LCD) devices are becoming very popular because of their advantageous features, such as, light weight, slimness, and low driving voltage. Furthermore, the LCD is growing in popularity because LCD devices are now being applied to office automation equipment, audio equipment, video equipment, and so on.

The LCD devices make use of the light transmittance characteristics of liquid crystal by varying an applied voltage and converting electric signals into visual information, thereby displaying an image (or a picture). The liquid crystal may be of a material which is in a medium state between liquid and crystal.

Actually, the LCD device according to the related art may include a color filter substrate, a substantially thin film transistor substrate, and a liquid crystal layer substantially interposed between the color filter substrate and the thin film transistor substrate. The color filter substrate may include: color filters, each having red, green and blue sub-color filters which realize a color scheme; a black matrix substantially separating the sub-color filter and shielding light; and a substantially transparent common electrode applying a voltage to the liquid crystal layer. In fact, the thin film transistor substrate may include: a plurality of gate and data wires, substantially arranged in vertical and horizontal directions, defining a plurality of pixel regions; substantially thin film transistors each formed at the crossing of the gate wires and the data wires; and pixel electrodes formed on the respective pixel regions.

Such color filter substrate and thin film transistor substrate, as configured above, may be separated at a fixed distance by means of spacers, so that a cell gap may be provided between them. These substrates are substantially combined by a seal pattern which may be formed on the outer edge of an image display area, thereby producing a liquid crystal panel.

Moreover, a silver (Ag) paste dot pattern substantially having an electrical conductivity and an adhesive property may be formed on the edge of the thin film transistor substrate. The silver paste dot pattern grounds the common electrode on the color filter substrate. In other words, the common electrode on the color filter substrate receives a common voltage through the silver paste dot pattern.

However, adhesive defects frequently occur with the silver paste dot pattern in the related art of LCD devices making it difficult to apply a stable common voltage to the common electrode on the color filter substrate. The resulting unstable common voltage applied to the common electrode on the color filter substrate may cause the substantial deterioration in the quality of images displayed by an LCD device which includes the silver paste dot pattern.

SUMMARY OF THE INVENTION

Accordingly, the present embodiments are directed to an LCD device that substantially obviates one or more of problems due to the limitations and disadvantages of the related art, and a manufacturing method thereof.

An advantage of the present embodiment is to provide an LCD device that has a structure capable of improving the quality of images, and a manufacturing method thereof.

Additional features and advantages of the invention will be set forth in the description which follows, and in part will be apparent from the description, or may be learned by practice of the embodiments. The advantages of the embodiments will be realized and attained by the structure particularly pointed out in the written description and claims hereof as well as the appended drawings.

Accordingly, to achieve these and other advantages and in accordance with the purpose of the present invention, as embodied and broadly described, an LCD device includes: an image display portion composed of pixels, the image display portion defined by the crossing of gate wires and data wires; a common wire located on the outside of the image display portion; a test wire located adjacent to a part of the common wire; and a wire connection electrode for connecting the common wire with the test wire.

In another aspect of the present invention, a method of manufacturing a LCD device includes: forming a common wire and a test wire on the edge of a substrate; forming a protective film on the common wire and the test wire; and forming a wire connection electrode for electrically connecting the common wire with the test wire, on the protective film.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the embodiments and are incorporated in and constitute a part of this application, illustrate embodiments of the invention and together with the description serve to explain the disclosure. In the drawings.

DETAILED DESCRIPTION OF THE ILLUSTRATED EMBODIMENTS

Reference will now be made in detail to the embodiments of the present disclosure, examples of which are illustrated in the accompanying drawings.

Figure 1:
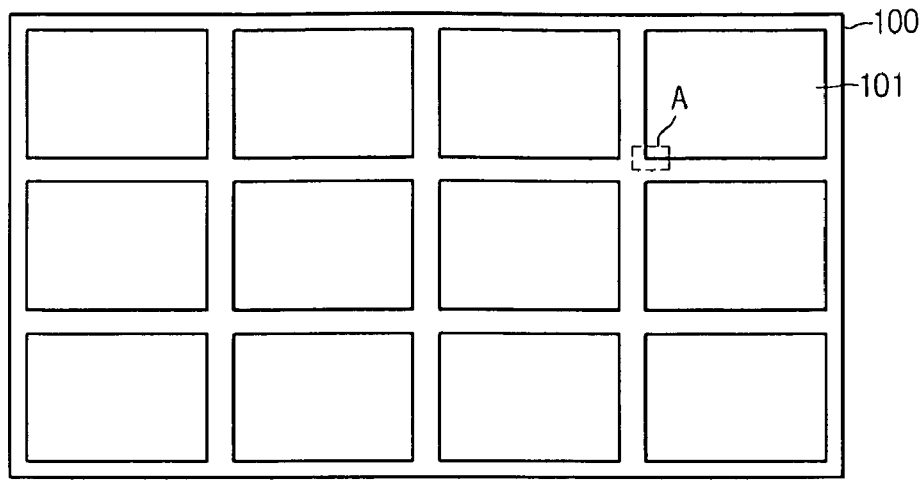
FIG. 1 is a planar view showing a mother substrate including a plurality of LCD devices according to an embodiment of the present disclosure, which are formed on the mother substrate.
Figure 2:
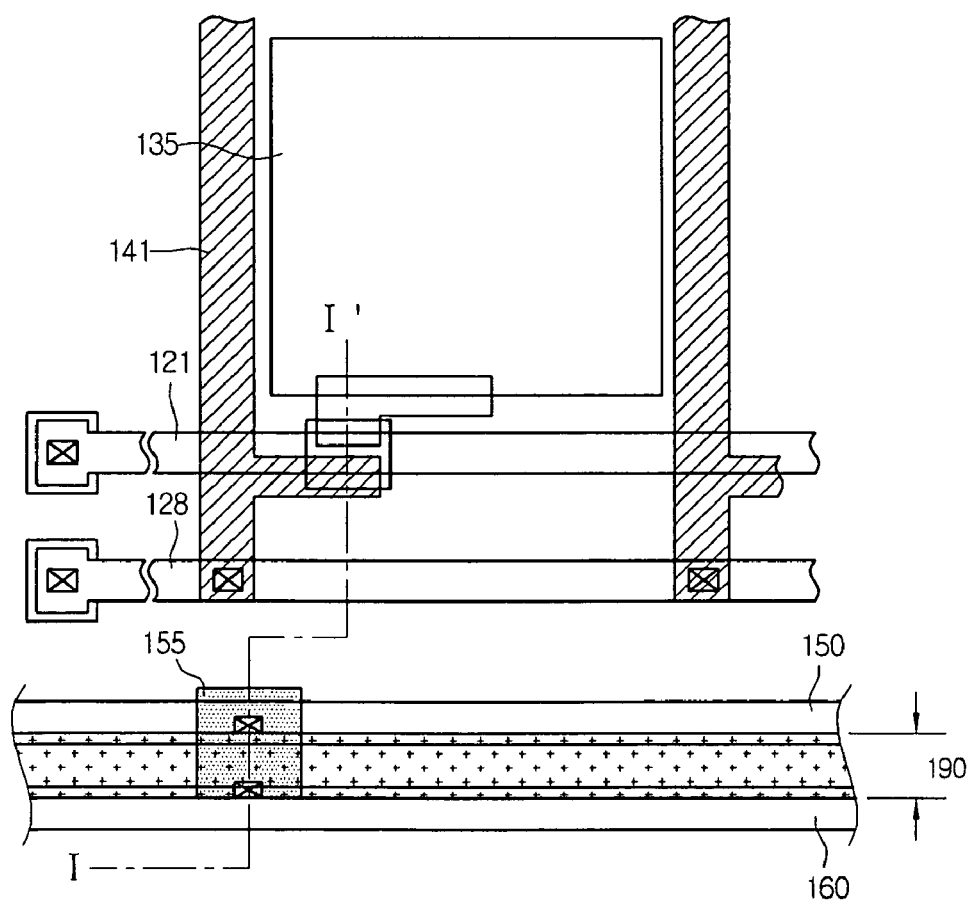
FIG. 2 is an enlarged view of the LCD device showing zone A in FIG. 1 in detail.
Figure 3:
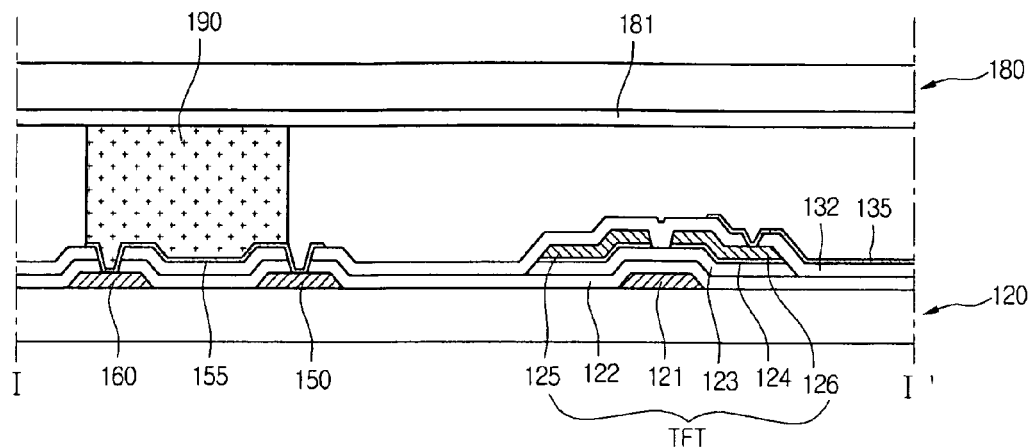
FIG. 3 is a cross-sectional view of the LCD device taken along the line I-I' shown in FIG. 2.

FIG. 1 is a planar view showing a mother substrate including a plurality of LCD devices according to an embodiment of the present disclosure, which are formed on a mother substrate. FIG. 2 is an enlarged view of the LCD device showing zone A in FIG. 1 in detail. FIG. 3 is a cross-sectional view of the LCD device taken along the line I-I' shown in FIG. 2. As shown in FIGS. 1 to 3, a plurality of LCD devices 101 according to an embodiment of the present disclosure are simultaneously formed on a transparent mother substrate 100. In other words, the plural LCD devices may be manufactured on the single mother substrate 100.

The LCD device may include a thin film transistor substrate 120, a color filter substrate 180, and a liquid crystal layer substantially interposed between them. The thin film transistor substrate 120 of the LCD device 101 may include gate wires 121 and data wires 141, which substantially cross each other and substantially center a gate insulation film on the mother substrate 100. The cross section of gate wires 121 and data wires 141 may define pixel regions. An area which includes the pixel regions may be used for an image display portion. Meanwhile, the remaining areas which may not include the pixel regions may be used for a non-display portion.

The thin film transistor substrate 120 may include substantially thin film transistors TFT formed at substantially the cross sections of the gate wires 121 and data wires 141, a ground wire may be electrically connected to the ends of the data wires 141, and a common wire disposed on an edge area of the thin film transistor substrate 120. On the lower area (zone A in FIG. 1) of the thin film transistor substrate 120, a test wire 160 may be formed substantially parallel to the common wire 150 at a fixed distance. The gate insulation film 122 may be formed on the thin film transistor substrate 120 which includes the gate wires 121, the common wire 150, and the test wire 160. A protective film (or a passivation film) 132 may be formed on the gate insulation film 122 which may be loaded with the thin film transistors TFT and the data wires 141.

The thin film transistor TFT may consist of a gate electrode 121, a gate insulation film 122, an active pattern 123, an ohmic contact pattern 124, a source electrode 125, and a drain electrode 126. More specifically, the gate electrode 121 of the thin film transistor TFT is provided by being branched from the gate wire 121 receiving a gate drive signal. The gate insulation film 122 substantially covers the gate electrode 121 and shields the gate electrode 121 from upper layers which may be formed on the gate insulation film 122. The active pattern 123 and the ohmic contact pattern 124 may be stacked on the gate insulation film 122. The source electrode 125 may also be formed by being substantially branched from the data wire 141. The drain electrode 126 may be disposed to be substantially separated from the source electrode 125 at a fixed distance on the gate insulation film 122.

The gate insulation film 122 is formed on the entire surface of the mother substrate 100. This gate insulation film 122 may substantially cover the gate electrode 121, the common wire 150, and the test wire 160.

The protective film 132 may be formed on the entire surface of the mother substrate 100 so that it may cover the thin film transistors TFT. This protective film 132 may include any one of an organic material and an inorganic material. Also, the protective film 132 may be provided with contact holes substantially exposing the drain electrode 126, the common wire 150, and the test wire 160.

On the protective film 132, pixel electrodes 135 may be formed by being extended and expanded from the respective contact holes. These pixel electrodes 135 may be opposite the respective pixel regions.

A wire connection electrode 155 may be formed on the protective film 132 substantially opposite the common wire 150 and the test wire 160, by being extended from the respective contact holes. The wire connection electrode 155 electrically connects the common wire 150 and the test wire 160 with each other.

The thin film transistor substrate 120 provided in this manner may be combined with the color filter substrate 180 which a common electrode 181 may be formed. To this end, a conductive seal pattern 190 may be formed on the edge areas of the thin film transistor substrate 120. The conductive seal pattern 190 allows the thin film transistor substrate 120 and the color filter substrate 180 to be substantially bonded together. Also, the conductive seal pattern 190 may be electrically connected to the common wire 150 and the test wire on the edge area of the thin film transistor substrate 120 through an electric contact with the wire connection electrode 155. In the end, the common electrode 181 on the color filter substrate 180 may be electrically connected to the common wire 150 and the test wire 160 on the edge area of the thin film transistor substrate 120, via the conductive seal pattern 190 and the wire connection electrode 155.

Thus, the LCD device according to the embodiment of the present invention may connect the test wire 160, which may be provided for a test process, with the common wire 150 by means of the wire connection electrode 155, so that the common wire 150 contacting the conductive seal pattern 190 can substantially have a uniform width (i.e., a substantially constant section size). Accordingly, the adhesive strength of the common wire 150 and the common electrode 181 may be improved. In other words, the LCD device according to the embodiment of present disclosure may have a structure substantially adapted to apply a stable common voltage to the common electrode 181 through the common wire 150. As a result, the LCD device may substantially prevent the deterioration of image quality which results from an instable common voltage, which is contrary to the related art.

Furthermore, the connection of the test wire 160 and the common wire 150 using the wire connection electrode 155 may be applied to an LCD device of GIP structure in which a gate driver may be mounted on the thin film transistor substrate 120. It is thus possible to substantially remove the instability of common voltage due to the non-uniform line resistance of the common wire. The non-uniform line resistance of the common wire 150 may result from the fact that the common wire 150 adjacent to the test wire 160 has a width substantially narrower (or a section size substantially smaller) than that which may be not formed adjacent the test wire 160. The narrow width (or the small section size) of the common wire 150 adjacent to the test wire 160 may result from the common wire 150 and the test wire 160 being formed on a substantially limited area between the LCD devices on the mother substrate 100.

The LCD device according to the embodiment of the present disclosure may be substantially exemplified in a TN mode of GIP structure including the gate driver on the thin film transistor substrate 120, but may not be limited to this. In other words, the scheme connecting the common wire 150 and the test wire 160 by means of the wire connection electrode 155 of a conductive material may be applied to LCD devices of substantially every type.

FIGS. 4A to 4F are cross-sectional views explaining a manufacturing method of LCD device according to an embodiment of the present disclosure. The LCD device manufactured by the method of this embodiment includes a plurality of pixels, but FIGS. 4A to 4F largely show only one among these plural pixels for convenience of explanation.

Figure 4A:
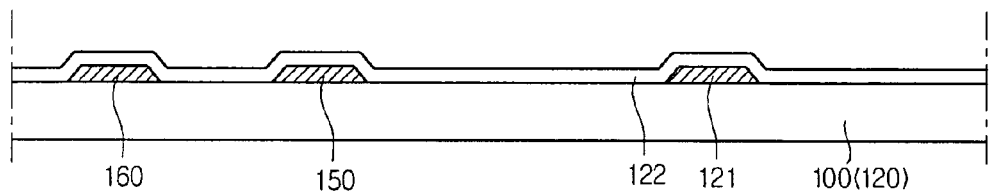
FIGS. 4A to 4F are cross-sectional views explaining a manufacturing method of the LCD device according to an embodiment of the present disclosure.

As illustrated in FIG. 4A, a conductive material may be substantially formed on a mother substrate 100, which may later be divided into a plurality of thin film transistor substrates 120, through a deposition method such as sputtering. The conductive material may be patterned into a test wire 160, a common wire 150, and a gate electrode 121 through a photographic process using a mask and an etching process. The test wire 160, common wire 150, and gate electrode 121 may include any one selected from a metal group of Aluminum Al, an alloy of Aluminum and Neodymium AlNd, Tungsten W, Cooper Cu, Molybdenum Mo, Chrome Cr, an alloy of Molybdenum and Tungsten Mow, and so on.

Also, a gate insulation film 122 may be substantially deposited on the mother substrate 100 which includes the test wire 160, common wire 150, and gate electrode 121. The gate insulation film 122 may be of any one among a silicone nitride ($SiN_x$) film, a silicon oxide ($SiO_2$), and a stacked layer including these which may be formed by a chemical vapor deposition method or a sputtering method.

Figure 4B:
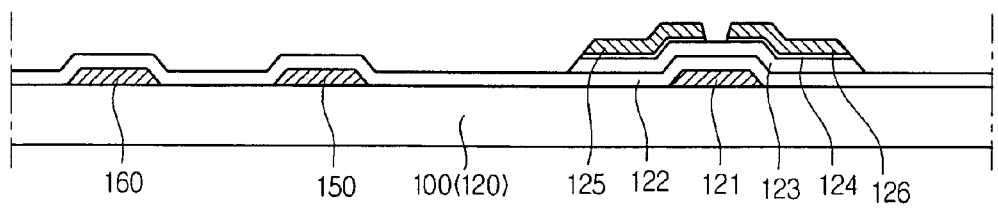

Referring to FIG. 4B, an amorphous silicon layer, an amorphous dopant silicon layer, and conductive layer may be substantially and sequentially stacked on the gate insulation film 122. These layers may be patterned into an active pattern 123 and an ohmic contact pattern 124 substantially opposite to the gate electrode 121 and source/drain electrodes 125 and 126 through the photographic process using another mask and the etching process. The active pattern 123, the ohmic contact pattern 124, the source/drain electrodes 125 and 126 and the gate electrode 121 together form a thin film transistor TFT.

Figure 4C:
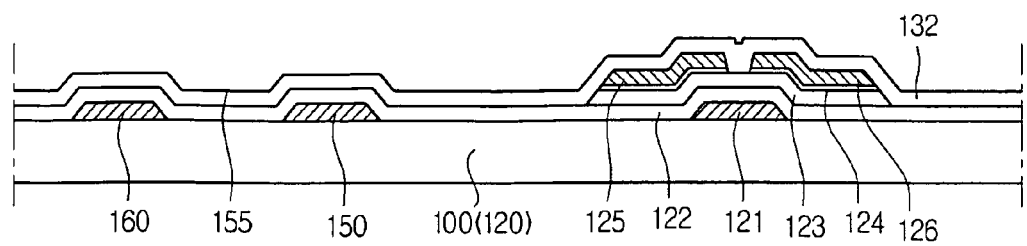

Then, a protective film 132 may be formed on substantially the entire surface of the mother substrate 100 which includes the thin film transistor TFT, as illustrated in FIG. 4C.

Figure 4D:
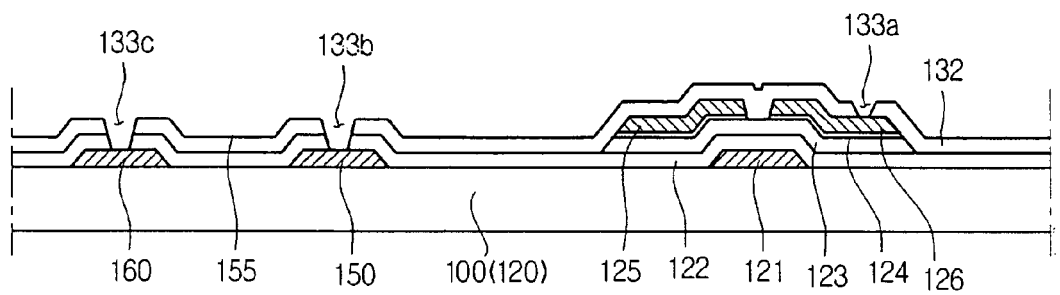

In the protective film 132, first to third contact holes 133a to 133c may be formed by the photographic process and the etching process, as illustrated in FIG. 4D. The first to third contact holes 133a to 133c substantially expose the drain electrode 126, the common wire 150, and the test wire 160.

Figure 4E:
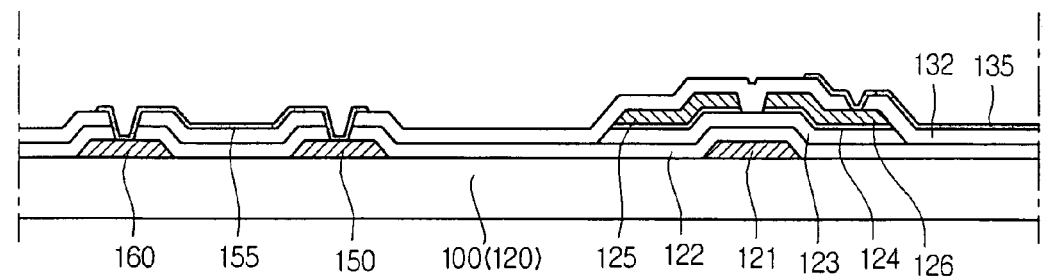

Referring to FIG. 4E, any one material selected from a transparent metal group including indium-tin-oxide ITO and indium-zinc-oxide IZO, may be deposited on the protective film 132 in which the first to third contact holes 133a to 133c may be formed. The transparent metal layer may be patterned through the photographic process using a mask and etching process, thereby forming a pixel electrode 135 and a wire connection electrode 155. The wire connection electrode 155 may be substantially extended from the second and third contact holes 133b and 133c and electrically connect the common wire 150 and the test wire 160.

Figure 4F:
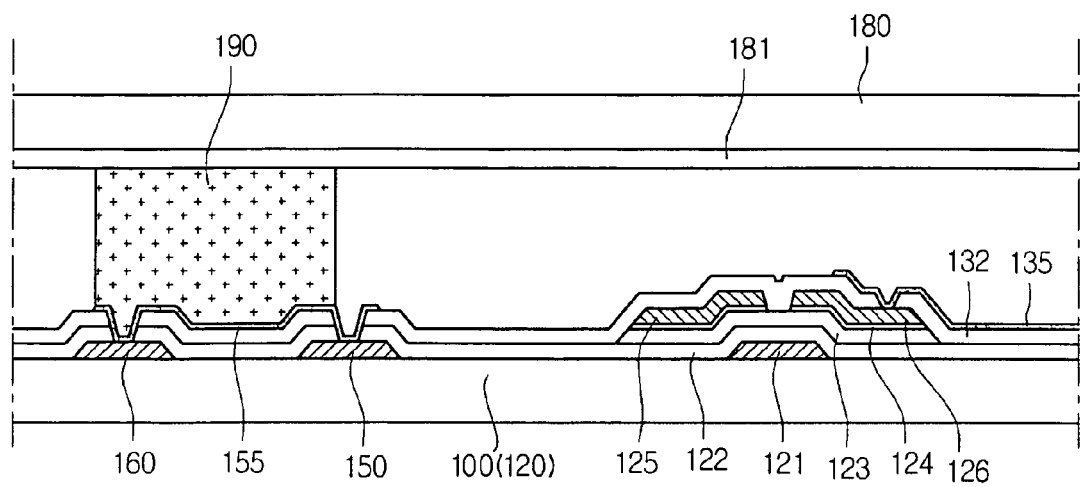

After the patterning process, a conductive seal pattern 190 may be coated on the edge areas of the thin film transistor substrates 120 in which the patterning process may be completed, as illustrated in FIG. 4F. Then, the thin film transistor substrates 120 each substantially coated with the conductive seal pattern 190 may be substantially combined with color filter substrates 180, in which common electrodes 181 may be formed, respectively. The conductive seal pattern 190 may be formed substantially opposite the wire connection electrode 155, thereby electrically connecting the common electrode 181, wire connection electrode 155, test wire 160, and common wire 150 with one another.

An LCD device manufactured in this way may connect the test wire 160 which may be provided for a test process with the common wire 150 by means of the wire connection electrode 155, so that the common wire 150 contacting the conductive seal pattern 190 may have a substantially uniform width (a substantially constant section size). Accordingly, the adhesive strength of the common wire 150 and the common electrode 181 may be improved. In other words, the LCD device may have a structure substantially adapted to apply a stable common voltage to the common electrode 181 through the common wire 150. As a result, the LCD device may prevent the deterioration of image quality which may result from the instable common voltage, which may be contrary to the related art.

More specifically, the process substantially connecting the test wire 160 and the common wire 150 by means of the wire connection electrode 155 may be applied to an LCD device of substantial GIP structure which may include a gate driver substantially mounted on the thin film transistor substrate 120, in order to substantially remove the instability of common voltage due to the non-uniform line resistance of the common wire. The non-uniform line resistance of the common wire 150 may result from the fact that the common wire 150 adjacent to the test wire 160 has a width substantially narrower (or a section size substantially smaller) than that which may not be formed substantially adjacent to the test wire 160.

As described above, the LCD device according to an embodiment of the present invention substantially connects the test wire, which may be provided for a test process, and the common wire by means of the wire connection electrode, so that the common wire may have a substantially uniform width (a substantially constant section size). In accordance therewith, the adhesive strength of the common wire and the common electrode may be improved. Also, a substantially stable common voltage may be applied to the common electrode through the common wire. As a result, the LCD device may substantially prevent the deterioration of image quality. Moreover, the LCD device according to the embodiment of the present invention may remove the process of forming the silver paste dot pattern of the related art, thereby substantially reducing the number of manufacturing steps.

It will be apparent to those skilled in the art that various modifications and variations can be made in the present invention without departing from the spirit or scope of the invention. Thus, it is intended that the present invention cover the modifications and variations of this embodiment provided they come within the scope of the appended claims and their equivalents.

What is claimed is:

1. A liquid crystal display device comprising:
   an image display portion composed of pixels, the image display portion defined by the crossing of gate wires and data wires;
   a common wire located on the outside of the image display portion;
   a test wire located adjacent to a part of the common wire and parallel to the common wire; and
   a wire connection electrode for connecting the common wire with the test wire,
   wherein the wire connection electrode is overlapped with the common wire and the test wire,
   wherein the test wire and the common wire are formed to a horizontal direction with a conductive seal pattern,
   wherein the conductive seal pattern is overlapped with a part of the test wire and a part of the common wire.

2. The liquid crystal display device as claimed in claim 1, wherein the wire connection electrode is formed with pixel electrodes for the pixels.

3. The liquid crystal display device as claimed in claim 1, wherein the conductive seal pattern is formed over the common wire and the test wire.

4. The liquid crystal display device as claimed in claim 1, wherein the conductive seal pattern contacts a common electrode on a color filter substrate.

5. A method of manufacturing a liquid crystal display device comprising:

forming a common wire and a test wire on the edge of a substrate;

forming a protective film on the common wire and the test wire;

forming a wire connection electrode for electrically connecting the common wire with the test wire, on the protective film; and forming a conductive seal pattern on the wire connection electrode, wherein a test wire is formed substantially parallel to the common wire, wherein the wire connection electrode is overlapped with the common wire and the test wire, wherein the test wire and the common wire are formed to a horizontal direction with a conductive seal pattern, wherein the conductive seal pattern is overlapped with a part of the test wire and a part of the common wire.

6. The method as claimed in claim 5, wherein the conductive seal pattern is electrically connected to a common electrode on a color filter substrate.

7. The method claimed as claim 5, wherein the test wire is formed adjacent to the common wire.

* * * * *